US008939272B2

(12) United States Patent
Nilsson

(10) Patent No.: US 8,939,272 B2
(45) Date of Patent: Jan. 27, 2015

(54) ARTICLE ORIENTING MACHINE

(75) Inventor: Jan Nilsson, Kalmar (SE)

(73) Assignee: Norden Machinery AB (SE)

( * ) Notice: Subject to any disclaimer, the term of this patent is extended or adjusted under 35 U.S.C. 154(b) by 0 days.

(21) Appl. No.: 14/235,394

(22) PCT Filed: Jul. 6, 2012

(86) PCT No.: PCT/SE2012/050794
§ 371 (c)(1),
(2), (4) Date: Jan. 27, 2014

(87) PCT Pub. No.: WO2013/015731
PCT Pub. Date: Jan. 31, 2013

(65) Prior Publication Data
US 2014/0166437 A1   Jun. 19, 2014

(30) Foreign Application Priority Data
Jul. 28, 2011   (SE) .................................... 1150725

(51) Int. Cl.
*B65G 47/252*   (2006.01)
*B65G 19/20*   (2006.01)
*B65B 35/58*   (2006.01)

(52) U.S. Cl.
CPC ...... *B65G 47/252* (2013.01); *B65G 2811/0631* (2013.01); *B65G 2811/0621* (2013.01); *B65G 19/205* (2013.01); *B65B 35/58* (2013.01)
USPC ................... 198/377.01; 198/377.1; 198/394; 198/404; 198/462.3; 198/474.1

(58) Field of Classification Search
CPC ..................... B65G 47/252; B65G 2811/0621; B65G 2811/0631; B65G 35/58; B65G 19/06

USPC ........... 198/375, 377.01, 377.07, 377.1, 379, 198/394, 404, 462.3, 474.1
See application file for complete search history.

(56) References Cited

U.S. PATENT DOCUMENTS 4,672,795 A   6/1987   Alexander et al.
5,447,013 A *  9/1995   Boriani et al. .................. 53/446
(Continued)

FOREIGN PATENT DOCUMENTS

DE   1800258 A1   5/1970
FR   2708759 A1   2/1995
(Continued)

OTHER PUBLICATIONS

"International Application Serial No. PCT/SE2012/050794, International Search Report mailed Oct. 26, 2012", 3 pgs.
"International Application Serial No. PCT/SE2012/050794, Written Opinion mailed Oct. 26, 2012", 5 pgs.

*Primary Examiner* — Mark A Deuble
(74) *Attorney, Agent, or Firm* — Schwegman Lundberg & Woessner, P.A.

(57) ABSTRACT

The invention relates to an article orienting machine for elongate articles, said machine comprising an endless first conveyor by which articles are conveyed with a first predetermined spacing, said elongate articles having their main axes arranged transverse to the direction of movement of said conveyor; at least a first and a second wheel on which the conveyor is supported; a first drive means arranged to rotate one of the wheels on which the conveyor is supported; and opposed pairs of holders attached to said endless conveyor at said first predetermined spacing, each pair of holders being arranged to contact and support an elongate article at opposite ends thereof while the article is received and released by the article orienting machine.

16 Claims, 5 Drawing Sheets

(56) References Cited

U.S. PATENT DOCUMENTS 5,647,190 A * 7/1997 Minarelli et al. ............... 53/446
5,871,079 A * 2/1999 Nannini et al. .......... 198/377.04
6,151,867 A  11/2000 Focke et al.
6,308,816 B1 * 10/2001 Bankuty et al. ............... 198/395

2009/0218193 A1  9/2009 Malini

FOREIGN PATENT DOCUMENTS

WO    WO-94/20370 A1      9/1994
WO    WO-2013/015731 A1   1/2013

* cited by examiner

ARTICLE ORIENTING MACHINE

RELATED APPLICATIONS

This application is a US National Stage application filed under 35 U.S.C. §371 from International application Serial No. PCT/SE2012/050794, filed Jul. 6, 2012 and published as WO 2013/015731 A1 on Jan. 31, 2013, which claims the priority benefit of Sweden Patent Application No.: 1150725-8, filed Jul. 28, 2011, the contents of which applications and publication are incorporated herein by reference in their entirety.

FIELD OF THE INVENTION

The present disclosure generally relates to an article orienting machine and an article orienting system for arranged to orient individual articles at regular intervals.

PRIOR ART

In the packaging industry, it is usual to make packages comprising a plurality of individual articles by placing them in a common container or by wrapping them in a film of transparent material such as a heat-shrinkable plastic film or the like.

Prior to grouping and packaging it may be required to orient the single articles for various reasons, such as for preventing reading the said distinctive signs, for example barcodes positioned on the articles, in order to promote the reading of the sole barcode of the whole package. There are known orienting apparatuses, such as shown in US 2009/218193A or FR 2708759, which are associated with packaging machines or packaging lines, acting on articles arranged beforehand in rows and columns and conveyed along an advance direction by a conveyor belt, said articles being positioned at a relatively great mutual distance in relation to the dimensions of the articles. These apparatuses comprise detectors arranged for identifying references provided on the articles to be oriented, such as for example a colour or a graphic sign. Said apparatuses comprise gripping heads or units which are supported by a slidable carriage positioned above the conveyor belt and moved along the advance direction of the articles, during an orienting phase. The gripping heads, which are provided with grasping means for grasping the articles, can be rotated around respective longitudinal axes by means of motors that are electronically linked to the said detectors.

A problem with the apparatuses disclosed above is the limitation of production speed, i.e. the limited number of articles oriented over the period of time.

In order to avoid structural breakage due to the significant masses—and therefore inertias—to be lifted, oriented and moved, the gripping heads can only lift and orient a small number of articles at the same time, if the apparatus and/or the packaging machine works at high operating speed.

A further problem with said apparatus is that the gripping means comprises complex and expensive mechanisms that have to be replaced according to the dimensions of the articles to be oriented. This limits the flexibility of the apparatus and causes prolonged machine downtimes whenever it is necessary to change the article size.

Further, the gripping means may damage portions of articles with which they come into contact, spoiling aesthetic features thereof.

An object of the invention is to provide an improved apparatus for orienting articles in order to overcome the above problems. A further object of the invention is to provide an apparatus capable to orient articles at regular intervals without affecting the overall production speed of the apparatus and any packaging machine associated therewith. A still further object is to obtain a flexible and versatile apparatus that make possible to orient articles of different dimensions and sizes, with short machine downtimes for adjustments.

THE INVENTION

The above problem is solved by means of an article orienting machine and an article orienting system according to the appended claims.

In the subsequent text, terms such as "front,", "rear", "inner", outer", etc. are referred to in relation to a main longitudinal axis in the direction of movement of a conveyor. The term "conveyor" is used for defining an arrangement for conveying articles, which arrangement can comprise an endless belt, a chain conveyor or a similar suitable means. The text also uses the term "elongate" for articles and containers, which term in this context is defined as an object that has its longest extension along a main central axis parallel to the longer of the side surfaces defining the object.

The invention relates to an article orienting machine for elongate articles, said machine comprising an endless first conveyor by which articles are conveyed with a first predetermined spacing. The elongate articles are boxes or cartons with three or more side surfaces and opposed end surfaces, said articles having their main axes arranged transverse to the direction of movement of said conveyor. The machine has at least a first and a second wheel on which the conveyor is supported and a first drive means arranged to rotate one of the wheels on which the conveyor is supported.

Opposed pairs of holders are attached to said endless first conveyor at said first predetermined spacing. Each pair of holders are arranged to contact and support an elongate article at opposite ends thereof while the article is received and released by the article orienting machine.

The machine is arranged to orient said articles at regular intervals, where the articles to be oriented are arranged with a second predetermined spacing, which second spacing corresponds to a whole multiple of the first predetermined spacing. The second spacing is equal to at least twice the first predetermined spacing, whereby the oriented articles are separated by at least one intermediate article. Hence, if it is desired to group articles in threes, then the holders for rotating articles are arranged at a spacing equal to three times the first spacing. This arrangement allows the first or the last article of a subsequent group of articles to be rotated.

Each article to be oriented is rotated about said main axis, which is located in a plane parallel to the first endless conveyor and transverse to the direction of movement of said conveyor. At least one of each pair of holders supporting opposed ends of an article to be rotated comprises a drivable member arranged to cause the article to rotate. Each drivable member is arranged to rotate said article over a predetermined angle. Although any angle is possible, the predetermined angle is determined by the cross sectional shape of the article. Hence, for a rectangular cross section the angle would be a multiple of 90°, such as 90°, 180° or 270°, depending on the desired orientation for the subsequent grouping.

Each holder comprises a first part fixedly connected to the first conveyor and a second part that can be displaced relative to the first part into and out of contact with the article. The movement of the second part can be achieved by a guide surface mounted on the article orienting machine. A guide follower on the second part of the holder can be held in contact with the guide surface by means of a spring or be controlled by a fixed guide slot or guide rail on the article orienting machine. The guide followers on the second parts of a pair of opposing holders will be displaced simultaneously by the respective guide surfaces as an article moving at the same speed as the first conveyor is located between the opposed holders. In this way the second parts of the holders can be moved from a first position adjacent their respective first parts, into a second position remote from the respective first parts where an article is supported and held in position between the second parts. This displacement is reversed as the holders reach the end of the first conveyor, whereby the article is released.

A drive arrangement for said drivable members is arranged adjacent the conveyor on one or both sides thereof, whereby the drive members are arranged to contact or be driven by the drive arrangement once an article to be rotated is supported by opposing holders. The drivable members are connected to the portion of the holder that is in direct contact with an article. This can be the second part of the respective holder or a rotatable portion of said second part. The drive arrangement for the drivable members comprises at least a first and a second wheel on which the drive arrangement is supported. The drive arrangement can comprise a toothed belt, a chain, or a similar suitable means for cooperating with a drive member such as a toothed gear, a sprocket or similar. A second drive means arranged to rotate one of the wheels on which the drive arrangement is supported.

The respective first wheels of the first conveyor and the drive arrangement are arranged on a common first axis and the respective second wheels of the conveyor and the drive arrangement are arranged on a common second axis. The first drive means is arranged to rotate a first axle drivingly connected to the first wheel on which the drive arrangement is supported, while the second drive means is arranged to rotate a second axle drivingly connected to the second wheel on which the conveyor is supported. This can be achieved by mounting the first wheels of the first conveyor and the drive arrangement on a first axle, whereby the first wheel of the drive arrangement is freely rotatable relative to this axle. Similarly, the second wheels of the first conveyor and the drive arrangement are mounted on a second axle, whereby the second wheel of the first conveyor is freely rotatable relative to this axle.

The first conveyor can comprise a single conveyor with holders mounted along the opposite edges of the conveyor, or two parallel, spaced apart conveyors each provided with opposed and aligned holders on each conveyor. In the latter case, the spacing can be set to accommodate elongate articles of different lengths. Each conveyor can comprise a belt, chain or a similar suitable means. Minor variations in length within an allowable tolerance range can be accommodated for by providing the holders with spring loaded article gripping or contacting means. In the text of the application however, a single conveyor is referred to.

The first conveyor is driven at a first speed, which is adapted to the rate at which articles are delivered to the article orienting machine. The drive arrangement is driven at a speed above or below said first speed, where the speed of the drive arrangement is selected to cause rotation of articles to be rotated about said predetermined angle. The difference in speed causes the drive members on the holder supporting the article to be oriented to be rotated between a pick-up point where the article is received and a release point where the article is delivered to a subsequent conveyor.

The speed of the drive arrangement can be controlled to be equal to said first speed at the time of receipt and release of articles to be rotated. This arrangement is preferable when articles are conveyed at relatively high speeds, where a sudden rotation of the holders as the drive members comes into driving contact with the drive arrangement at or immediately after pick-up of the article can cause a relative displacement between holder and article. The drive arrangement can be driven by an electric or hydraulic servo motor, or by other suitable means allowing for stepless speed control.

Alternatively, the conveyor is driven at a first speed and the drive arrangement is driven at a constant second speed above or below said first speed. This arrangement is preferable when articles are conveyed at relatively low speeds, when there is little chance of a sudden rotation of the holders at or immediately after pick-up of the article. The drive arrangement can be driven by an electric or hydraulic servo motor, as described above, or by a mechanical transmission connected to the drive for the first conveyor.

The distance between first and the second axle of the first conveyor and the drive arrangement is preferably equal to the second spacing. This arrangement provides a minimum of speed variations and peak loads on the drive means as articles are picked up, rotated and released.

The invention further relates to an article orienting system comprising a supply conveyor arranged to supply elongate articles at a first spacing, an article orienting machine receiving said articles, and a grouping conveyor arranged to receive articles from the article orienting machine and to group a predetermined number of articles prior to a packaging operation.

The article orienting machine comprises an endless first conveyor by which articles are conveyed with a first predetermined spacing, said articles having their main axes arranged transverse to the direction of movement of said conveyor. Opposed pairs of holders are attached to said endless conveyor at said first predetermined spacing, each pair of holders being arranged to contact and support an elongate article at opposite ends thereof while the article is received from the supply conveyor and released to the grouping conveyor.

The system is arranged to orient said articles at regular intervals, where the articles to be oriented by the article orienting machine are arranged with a second predetermined spacing, which second spacing corresponds to a whole multiple of the first predetermined spacing. The second spacing is equal to at least twice the first predetermined spacing, whereby the oriented articles are separated by at least one intermediate article. Hence, if it is desired to group articles in threes, then the holders for rotating articles are arranged at a spacing equal to three times the first spacing. This arrangement allows the first or the last article of a subsequent group of articles to be rotated.

Each article to be oriented is rotated about said main axis, which is located in a plane parallel to the first endless conveyor and transverse to the direction of movement of said conveyor. At least one of each pair of holders supporting opposed ends of an article to be rotated comprises a drivable member arranged to cause the article to rotate. Each drivable member is arranged to rotate said article over a predetermined angle. Although any angle is possible, the predetermined angle is determined by the cross sectional shape of the article. Hence, for a rectangular cross section the angle would be a multiple of 90°, such as 90°, 180° or 270°, depending on the desired orientation for the subsequent grouping.

The articles to be oriented by the article orienting machine are the first or the last article in a group assembled by the grouping conveyor. An example of a container to be oriented by the system is an elongated, rectangular box, such as a toothpaste package, with a fifth panel. The fifth panel is a side panel having a width up to twice the width of an opposing panel. By rotating the first or the last article in a group comprising such containers, the fifth panel will overlap an adjacent container instead of extending outwards away from the group of containers.

The article orienting machine comprises a first drive means is arranged to drive the first conveyor and second drive means is arranged to a drive arrangement for the drivable members for rotating the holders. The first conveyor is driven at a first speed and the drive arrangement is driven at a speed above or below said first speed, where the speed of the drive arrangement is selected to cause rotation of articles to be rotated about said predetermined angle.

As described above, the speed of the drive arrangement is preferably controlled to be equal to said first speed at the time of receipt and release of articles to be rotated.

However, the speed of the drive arrangement can also be a constant second speed selected above or below the first speed of the first conveyor.

The first and the second drive means are stopped when one or more articles to be supplied from the supply conveyor are missing.

This allows the system to compensate for disturbances upstream, e.g. in the filling or packaging sections of a line, and ensures that the first or the last article of a subsequent group of articles is rotated.

DESCRIPTION OF THE DRAWINGS

The invention will now be described in detail with reference to the appended drawing figures. It is understood that the drawing figures are only illustrations and are not intended to define the scope of the invention, which is defined by the claims appended below. It is further understood that the drawing figures are not necessarily drawn to scale, and that, unless otherwise indicated, the drawing figures only show schematic illustrations of constructions and methods described herein.

PREFERRED EMBODIMENTS

Figure 1:
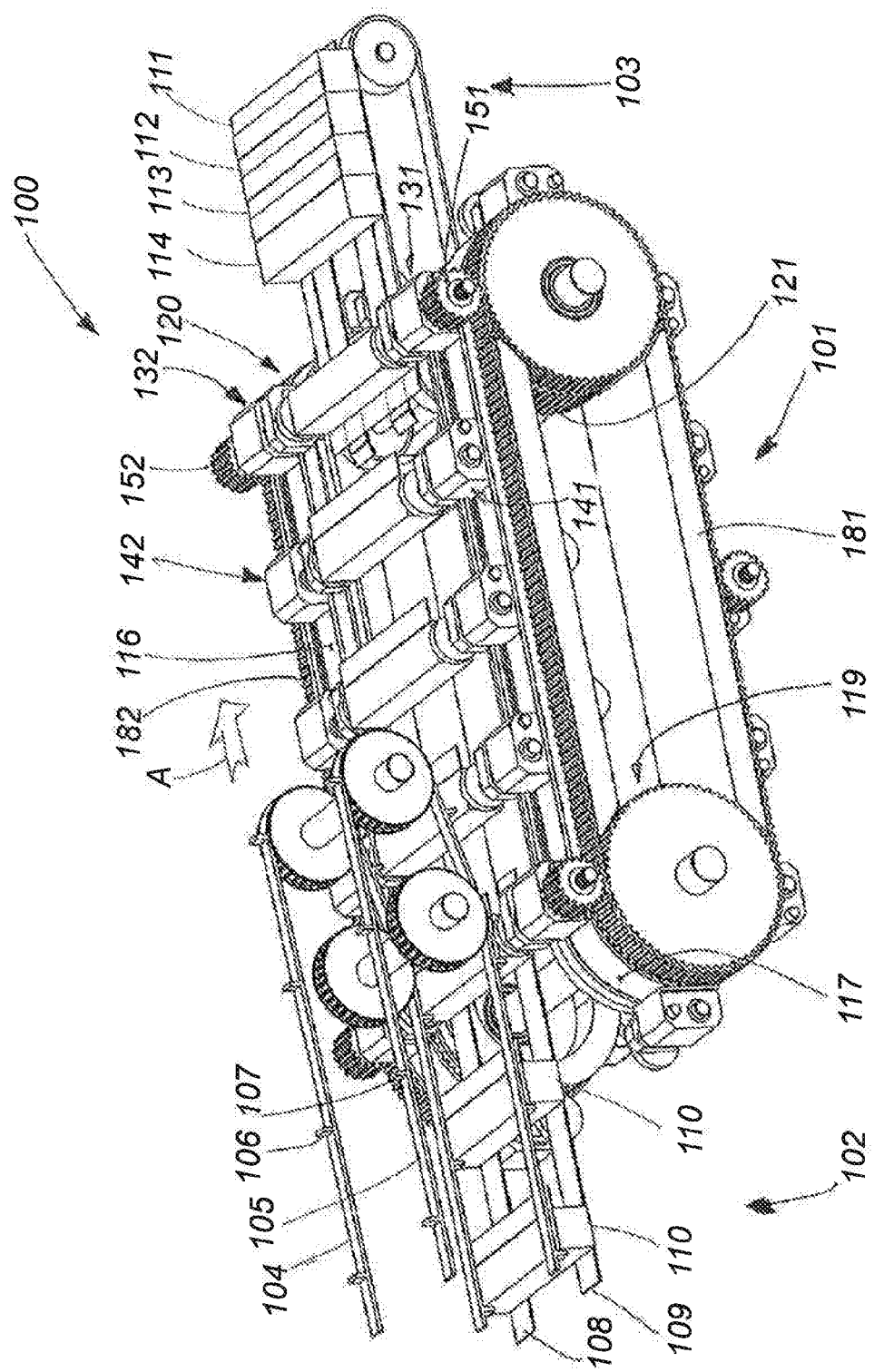
FIG. 1 shows a schematic perspective view of an article orienting system according to a first embodiment of the invention.

FIG. 1 shows a schematic perspective view of an article orienting system 100 comprising an article orienting machine 101 according to a first embodiment of the invention. In the example shown in FIG. 1 the articles or containers to be oriented by the system are elongated, rectangular boxes, such as a toothpaste packages, with a fifth panel. The fifth panel is a side panel having a width up to twice, in this example half, the width of an opposing panel (see FIG. 4). By rotating the first container in a group comprising such articles or containers 180°, the fifth panel of the first container will overlap an adjacent container instead of extending outwards away from the group of containers. The containers 110 to be oriented by the article orienting machine are the first containers 111 in each group of four containers 111-114 assembled by a grouping conveyor 103.

The containers 110 are moved into the article orienting machine by means of a supply conveyor 102, which in this case comprises a pair of parallel belts 104, 105 provided with transverse tabs 106, 107 arranged with a first spacing for pushing the containers along a pair of parallel guide rails 108, 109. In FIG. 1 the guide rails 108, 109 are located underneath the supply conveyor 102, but they can also be arranged above the supply conveyor. The supply conveyor 102 moves the containers 110 from a cartoning machine located upstream of the article orienting system 100. The supply conveyor 102 is synchronized with the speed of the cartoning machine and the article orienting machine 101 and uses the same spacing between containers as the said machines. The parallel belts 104, 105 of the supply conveyor are driven by a common servo motor (not shown) and the transverse spacing between the belts can be adjusted to the length of the elongated containers 110.

Figure 2:
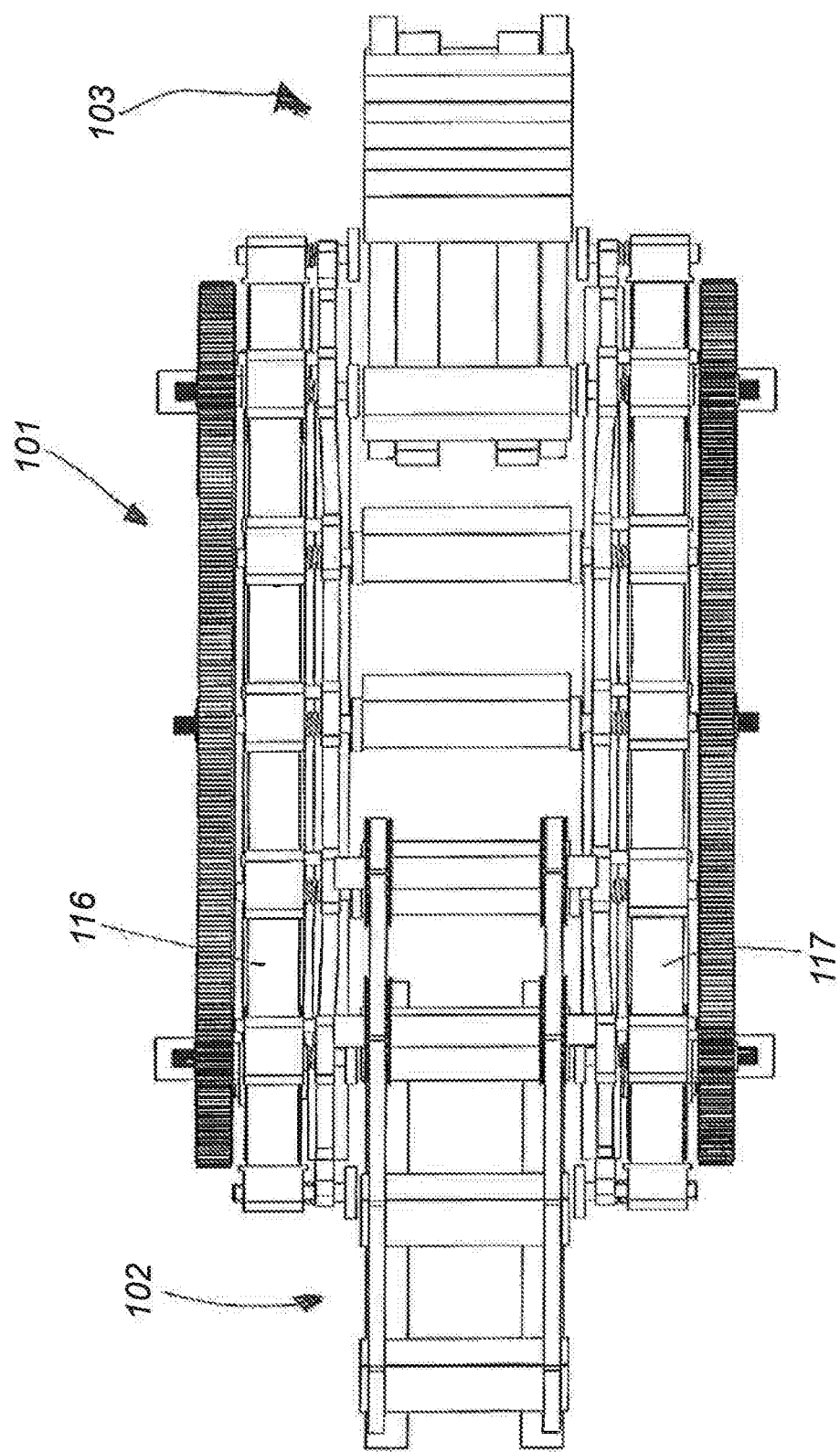
FIG. 2 shows a plan view of the article orienting system in FIG. 1.

The article orienting machine 101 comprises an endless first conveyor comprising two parallel, spaced belts 116, 117 by which the containers are conveyed with said first spacing. The supply conveyor 102 is arranged to extend into the space between the spaced belts 116, 117. The elongate containers 110 are boxes or cartons with three or more side surfaces and opposed end surfaces, said containers having their main axes arranged transverse to the direction of movement A of said first conveyor. The article orienting machine has a pair of first and second wheels 118, 119; 120, 121 on which the respective spaced belts 116, 117 are supported and a first drive means, such as a servo motor (not shown), arranged to rotate an axle for the second wheels 120, 121 on which the spaced belts 116, 117 are supported. FIG. 2 shows a plan view of the article orienting system 100. This figure indicates how the supply conveyor 102 and the grouping conveyor 103 extends between the parallel belts 116, 117 of the article orienting machine 101.

FIG. 1 further shows how opposed pairs of holders 131, 132; 141, 142 are attached to the spaced belts making up the first conveyor at said first predetermined spacing. Each pair of holders are arranged to contact and support an elongate container at opposite ends thereof while the container is received and released by the article orienting machine. Every pair of rotatable holders 131, 132 are separated by three pairs of non-rotatable holders 141, 142.

The article orienting machine is arranged to orient said containers at regular intervals, where the containers to be oriented are arranged with a second predetermined spacing. In this example the second spacing corresponds to four times the first spacing. As it is desired to group the single containers 110 in groups of four containers 111-114, the holders 131, 132 for rotating containers are arranged at a spacing equal to four times the first spacing. This arrangement allows the first or leading container 111 in successive groups of articles to be rotated.

Each container 110 to be oriented is rotated about its main axis, which is located in a plane parallel to the first endless conveyor and transverse to the direction of movement A of said conveyor. Each pair of holders 131, 132 supporting opposed ends of a container 110 to be rotated comprises a drivable member 151, 152 arranged to cause the container to rotate. In the example shown in FIG. 1, both opposed holders comprise a drivable member in the form of a toothed gear 151, 152. Each drivable member is arranged to rotate said container over a predetermined angle, which in this case is 180°. The drive members 151, 152 are driven by a respective toothed belt 181, 182, which will be described in detail in connection with FIG. 5 below.

Figure 3:
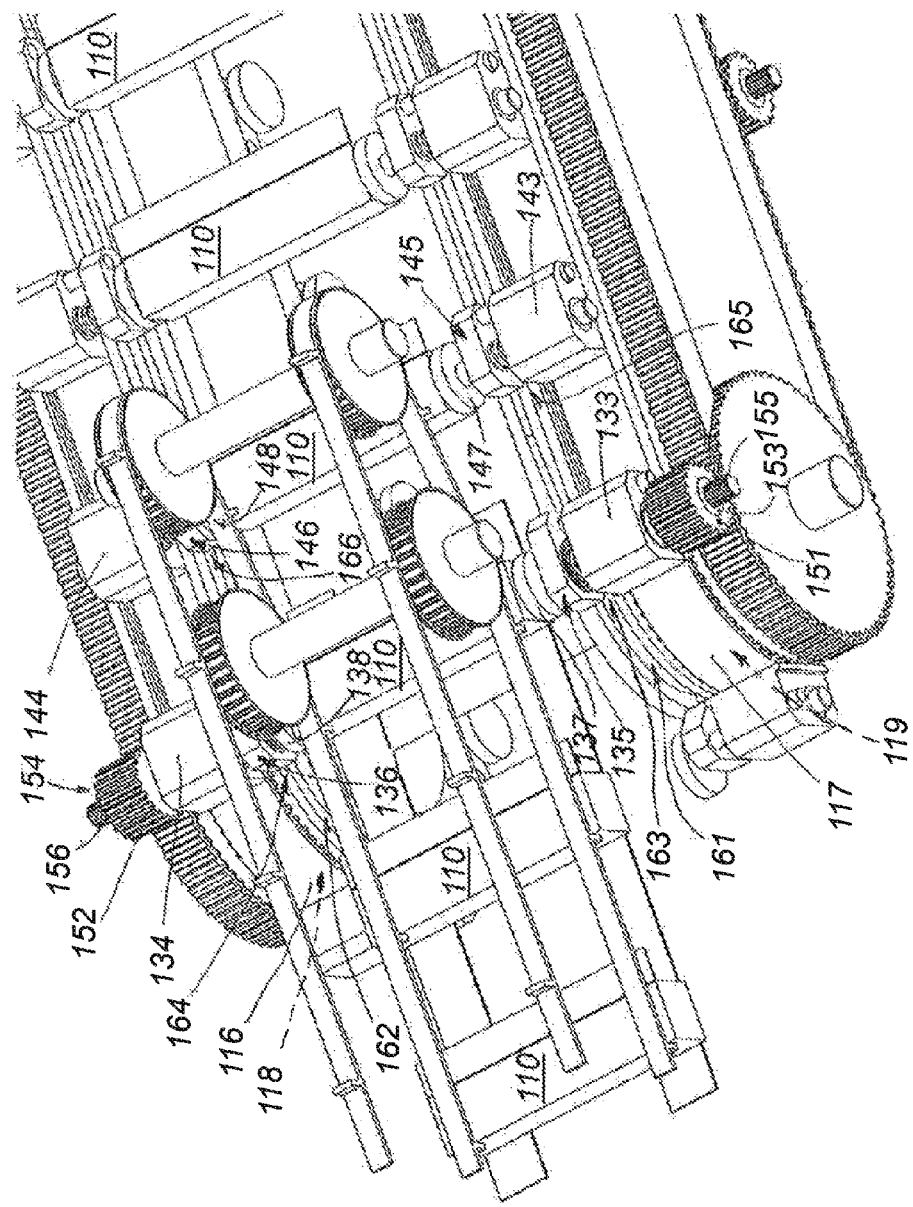
FIG. 3 shows an enlarged view of a conveyor supplying articles to an article orienting machine according to the invention.

FIG. 3 shows that each holder 131, 132; 141, 142 comprises a first part 133, 134; 143, 144 fixedly connected to the parallel belts 116, 117 of the first conveyor and a second part 135, 136; 145, 146 that is displaced linearly relative to the first part 133, 134; 143, 144 into and out of contact with the containers 110. The drivable members 151, 152 are rotatably supported on an axle 153, 154 mounted on the first part 133, 134 of the rotatable holders 131, 132, and is consequently connected to the second part 135, 136 of every fourth holder that is in direct contact with a container 110. The second part 135, 136 of the respective rotatable holder 131, 132 has a rotatable portion 137, 138 that is displaced transversely relative to the first conveyor with said second part 135, 136. The rotatable portion 137, 138 extends through the first part 133, 134 of the holder and is slidable in the axle 153, 154 supporting the drive member 151, 152 by means of a splined connection 155, 156 that allows the rotatable portion 137, 138 to be driven by the drive member 151, 152. The non-rotatable holders are provided with a corresponding container contacting portion 147, 148 that is non-rotatable relative to the second part 145, 146.

The transverse movement of the second part 135, 136; 145, 146 and the rotatable/non-rotatable portion 137, 138; 147, 148 relative to the first part 133, 134; 143, 144 is achieved by a guide slot 161, 162 on chassis of the article orienting machine 101. A guide follower 163, 164; 165, 166 on the second part 135, 136; 145, 146 of every holder 131, 132; 141, 142 cooperates with the fixed guide slot 161, 162 on the article orienting machine. The guide followers 163, 164; 165, 166 on the second parts of a pair of opposing holders will be displaced simultaneously by the respective guide slots 161, 162 as a container 110 moving at the same speed as the first conveyor is located between the opposed holders. In this way the second parts of the holders can be moved from a first position adjacent their respective first parts, into a second position remote from the respective first parts where an article is supported and held in position between the rotatable and non-rotatable portions of the second parts. The containers are gripped and supported by the holders when said holders are moving in a straight line between the first and second wheels 118, 119; 120, 121 of the first conveyor. This displacement is reversed as the holders reach the end of the first conveyor, whereby the container is released to a grouping conveyor.

Minor variations in length within an allowable tolerance range can be accommodated for by providing the holders with spring loaded article gripping or contacting means.

Figure 4:
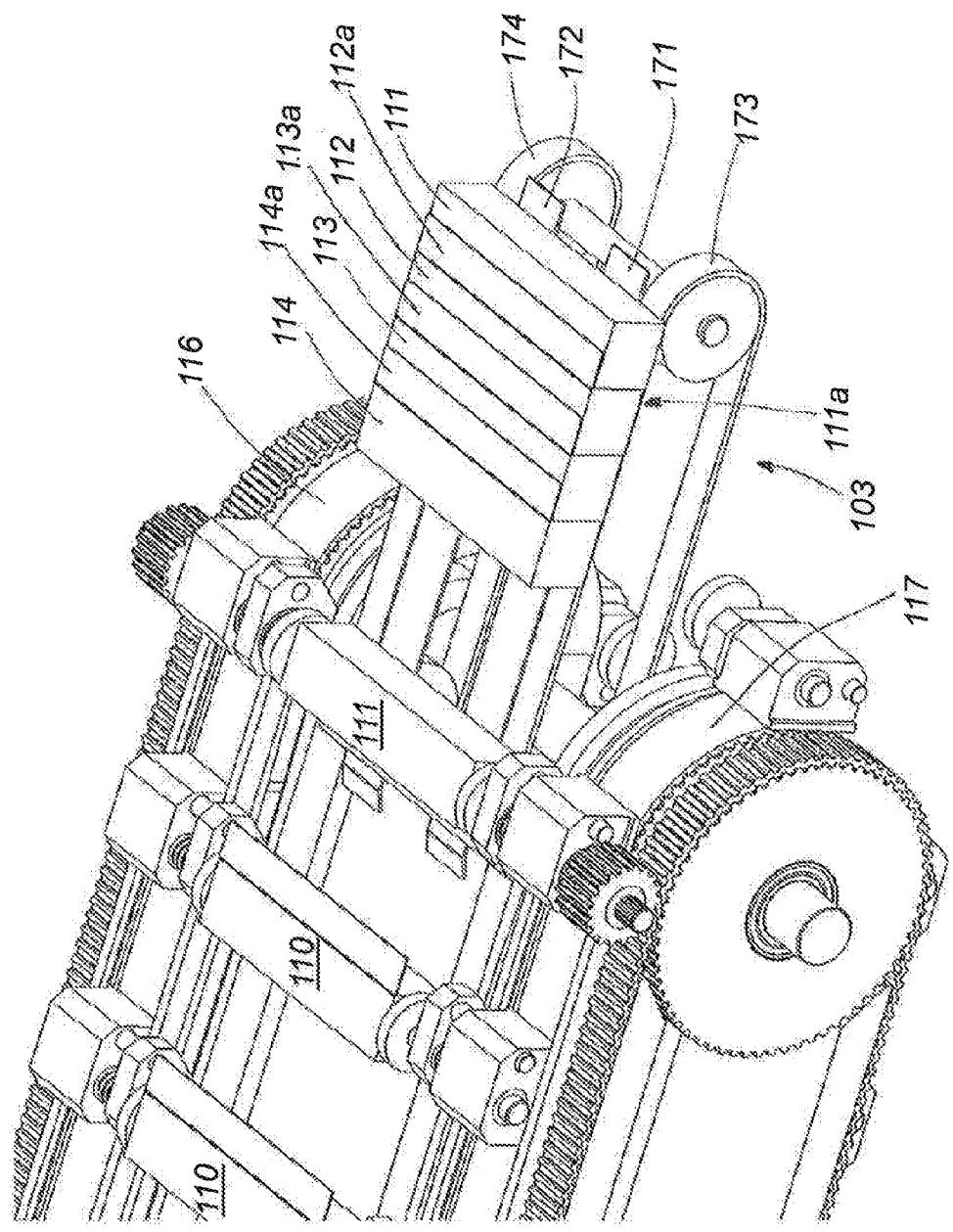
FIG. 4 shows an enlarged view of a grouping conveyor receiving articles from an article orienting machine according to the invention.

FIG. 4 shows a schematic view of the end of the first conveyor of the article orienting machine 101 and the grouping conveyor 103. This figure shows a completed group of containers 111-114 and a number of containers 110 approaching the grouping container 103, wherein a leading container 111' of a group to be formed has been rotated 180 degrees. As the containers are released by the holders, the will be moved along the grouping conveyor 103 by a pair of guide rails 171, 172 by a pair of parallel drive belts 173, 174. As can be seen from the figure, the fifth panel 111a of the first container 111 in the assembled group is arranged underneath the adjacent subsequent container 112. The respective fifth panels 112a, 113a, 114a each overlap the adjacent preceding container 111, 112, 113.

The article orienting machine delivers the containers to the grouping conveyor 103, which comprises said two belts 173, 174 located below the level of the belts 116, 117 of the first conveyor. When released, the container 111' will drop a few millimetres onto the belts 173, 174 of the grouping conveyor 103, which will move the containers forwards at a controlled speed. When the first container 111 in a group is released onto the grouping conveyor, it will be moved forwards at a speed corresponding to the width of one container per cycle. A cycle corresponds to the time taken until a subsequent container is released onto the grouping conveyor. Hence, when the second container 112 in a group is released onto the grouping conveyor, it will be located adjacent the first container 111. When the last container 114 in a group has been released onto the grouping conveyor 103, the speed of the belts 173, 174 will increased for a predetermined time (less than a cycle) allowing the groups to be separated from each other.

Figure 5:
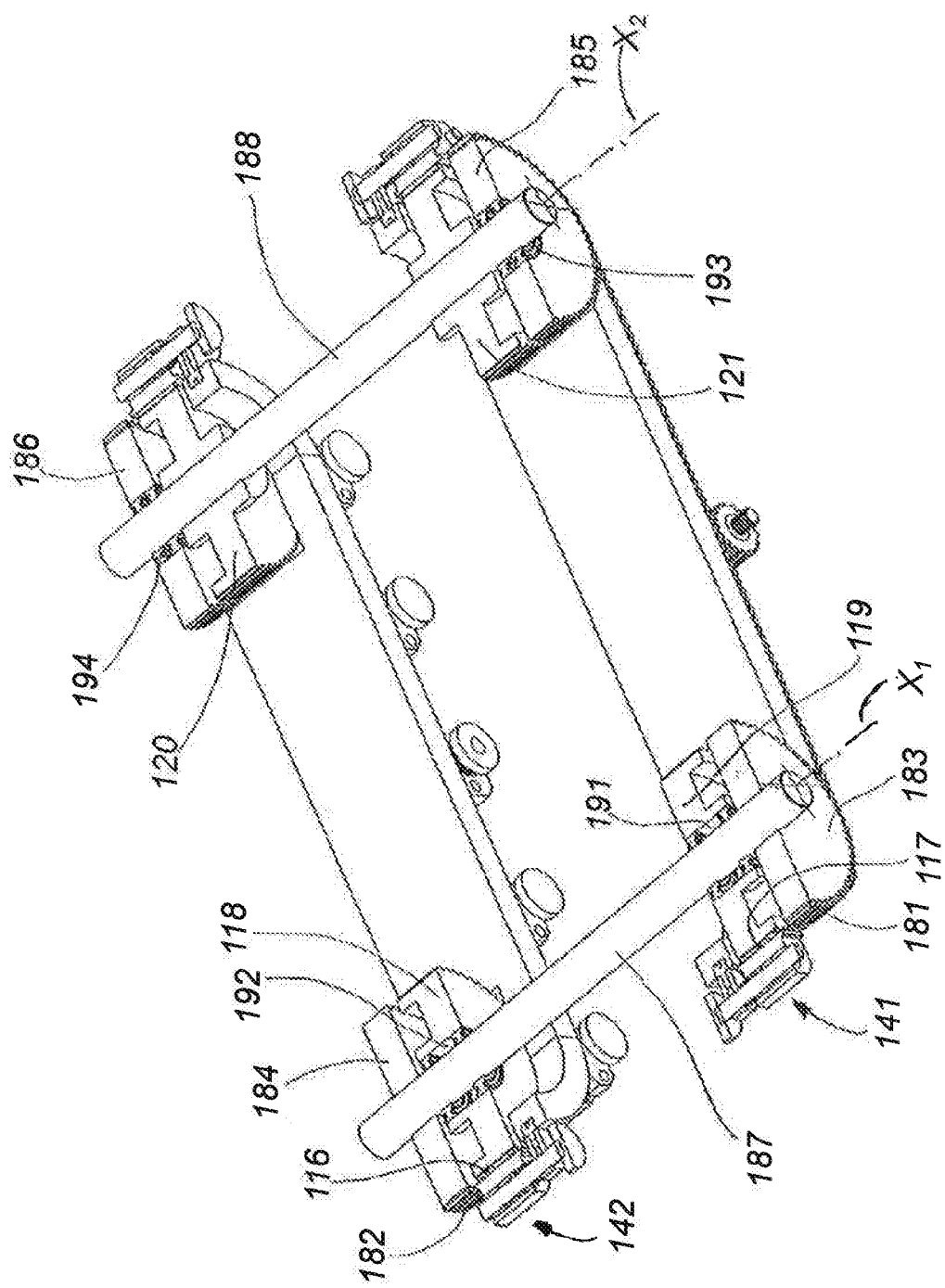
FIG. 5 shows a schematic view of a drive system for an article orienting machine according to the invention.

FIG. 5 shows a drive arrangement for said drivable members 151, 152 (see FIGS. 1 & 3) is arranged adjacent the parallel belts 116, 117 of the first conveyor on the outer sides thereof. The drive members are arranged to be in contact with the drive arrangement which is driven once an article to be rotated is supported by opposing holders. The drivable members 151, 152 are connected to the portion of the holder that is in direct contact with a container 110, that is, the rotatable portion 137, 138 of said second part 135, 136 as in FIG. 3 as described above. The drive arrangement for the drivable members comprises a pair of first and a second wheels 183, 184; 185,186 on which corresponding double-sided toothed belts 181, 182 are supported. The toothed belts 181, 182 are arranged on opposed sides of the respective first and second wheels 118, 119; 120, 121 of the parallel belts 116, 117 of the first conveyor. A second drive means in the form of a controllable speed servo motor (not shown) is arranged to rotate the first wheels 183, 184 on which the parallel belts 116, 117 of the drive arrangement is supported.

The respective first wheels 118, 119; 183, 184 of the first conveyor and the drive arrangement are arranged on a common first axis $X_1$ and the respective second wheels 120, 121; 185, 186 of the conveyor and the drive arrangement are arranged on a common second axis $X_2$. The first drive means is arranged to rotate a first axle 187 drivingly connected to the first wheels 183, 184 on which the belts 181, 182 of the drive arrangement are supported, while the second drive means is arranged to rotate a second axle 188 drivingly connected to the second wheels 120, 121 on which belts 116, 117 of the first conveyor are supported. This can be achieved by mounting the first wheels 118, 119; 183, 184 of the first conveyor and the drive arrangement on the first axle 187, whereby the first wheels 118, 119 of the drive arrangement are mounted on bearings 191, 192 making them freely rotatable relative to this axle 187. Similarly, the second wheels 120, 121; 185, 186 of the first conveyor and the drive arrangement are mounted on the second axle 188, whereby the second wheels 185, 186 of the first conveyor are mounted on bearings 193, 194 making them freely rotatable relative to this axle.

Referring to FIG. 1, the belts 116, 117 of the first conveyor are driven at a first speed, which is adapted to the rate at which containers are delivered to the article orienting machine 101. The belts 181, 182 of the drive arrangement are driven at a speed above or below said first speed, where the speed of the drive arrangement is selected to cause rotation of containers to be rotated about said predetermined angle of 180°. The difference in speed causes the drive members 151, 152 on the holder 131, 132 supporting the container to be oriented to be rotated between a pick-up point where the container is received and a release point where the container is delivered to a subsequent conveyor.

The speed of the drive arrangement is controlled to be equal to, or synchronized with, said first speed at the time of receipt and release of containers to be rotated. This arrangement is preferable when articles are conveyed at relatively high speeds, where a sudden rotation of the holders as the drive members comes into driving contact with the drive arrangement at or immediately after pick-up of the article can cause a relative displacement between holder and article. The drive arrangement can be driven by an electric or hydraulic servo motor, or by other suitable means allowing for stepless speed control.

The first and the second drive means are stopped when one or more articles to be supplied from the supply conveyor 102 are missing. This allows the system to compensate for disturbances upstream, e.g. in the filling or packaging sections of a line, and ensures that the first or the last article of a subsequent group of articles is rotated.

The invention can be varied freely within the scope of the appended claims.

The invention claimed is:

1. An article orienting machine for elongate articles, said machine comprising:
   an endless first conveyor by which articles are conveyed with a first predetermined spacing, said elongate articles having their main axes arranged transverse to the direction of movement of said conveyor;
   at least a first and a second wheel on which the conveyor is supported;
   a first drive means arranged to rotate one of the wheels on which the conveyor is supported; and
   opposed pairs of holders attached to said endless conveyor at said first predetermined spacing, each pair of holders being arranged to contact and support an elongate article at opposite ends thereof while the article is received and released by the article orienting machine,
   wherein the machine is arranged to orient said articles at regular intervals, where the articles to be oriented are arranged with a second predetermined spacing, which second spacing corresponds to a whole multiple of the first predetermined spacing, equal to at least twice the first predetermined spacing,
   that each article to be oriented is rotated about said main axis located in a plane parallel to the first endless conveyor and transverse to the direction of movement of said conveyor,
   that at least one of each pair of holders supporting opposed ends of an article to be rotated comprises a drivable member arranged to cause the article to rotate, and
   that each drivable member is arranged to rotate said article over a predetermined angle.

2. The article orienting machine according to claim 1, wherein a drive arrangement for said drivable members is arranged adjacent the conveyor on at least one side thereof, whereby the drive members are arranged to contact the drive arrangement when an article to be rotated is supported by opposing holders.

3. The article orienting machine according to claim 2, wherein the drive arrangement for the drivable members comprises at least a first and a second wheel on which the drive arrangement is supported.

4. The article orienting machine according to claim 3, wherein a second drive means arranged to rotate one of the wheels on which the drive arrangement is supported.

5. The article orienting machine according to any one of claims 1-4, wherein the respective first wheels of the conveyor and the drive arrangement are arranged on a common first axis and the respective second wheels of the conveyor and the drive arrangement are arranged on a common second axis.

6. The article orienting machine according to claim 5, wherein the first drive means is arranged to rotate a first axle drivingly connected to the first wheel on which the conveyor is supported.

7. The article orienting machine according to any one of claim 1, wherein the second drive means is arranged to rotate a second axle drivingly connected to the second wheel on which the drive arrangement is supported.

8. The article orienting machine according to claim 7, wherein the conveyor is driven at a first speed and the drive arrangement is driven at a speed above or below said first speed, where the speed of the drive arrangement is selected to cause rotation of articles to be rotated about said predetermined angle.

9. The article orienting machine according to claim 8, wherein the speed of the drive arrangement is controlled to be equal to said first speed at the time of receipt and release of articles to be rotated.

10. The article orienting machine according to claim 9, wherein the distance between first and the second axle is equal to the second spacing.

11. An article orienting system comprising:
    a supply conveyor arranged to supply elongate articles at a first spacing, an article orienting machine receiving said articles, and a grouping conveyor arranged to receive articles from the article orienting machine and to group a predetermined number of articles,
    said article orienting machine comprising an endless first conveyor by which articles are conveyed with a first predetermined spacing, said articles having their main axes arranged transverse to the direction of movement of said conveyor; and
    opposed pairs of holders attached to said endless conveyor at said first predetermined spacing, each pair of holders being arranged to contact and support an elongate article at opposite ends thereof while the article is received from the supply conveyor and released to the grouping conveyor,
    characterized in that
    the system is arranged to orient said articles at regular intervals, where the articles to be oriented by the article orienting machine are arranged with a second predetermined spacing, which second spacing corresponds to a whole multiple of the first predetermined spacing, equal to at least twice the first predetermined spacing,
    that each article to be oriented is rotated about said main axis located in a plane parallel to each conveyor and transverse to the direction of movement of said conveyors,
    that at least one of each pair of holders supporting opposed ends of an article to be rotated comprises a drivable member arranged to cause the article to rotate, and
    that each drivable member is arranged to rotate said article over a predetermined angle.

12. The article orienting system according to claim 11, wherein the articles to be oriented by the article orienting machine are the first or the last article in a group assembled by the grouping conveyor.

13. The article orienting system according to claim 11, wherein a first drive means is arranged to drive the first conveyor and second drive means is arranged to a drive arrangement for the drivable members.

14. The article orienting system according to claim 13, wherein the first conveyor is driven at a first speed and the drive arrangement is driven at a speed above or below said first speed, where the speed of the drive arrangement is selected to cause rotation of articles to be rotated about said predetermined angle.

15. The article orienting system according to claim 14, wherein the speed of the drive arrangement is controlled to be equal to said first speed at the time of receipt and release of articles to be rotated.

16. The article orienting system according to claim 14, wherein the first and the second drive means are stopped when one or more articles to be supplied from the supply conveyor are missing.

* * * * *